(12) United States Patent
Nagura (10) Patent No.: US 10,114,108 B2
(45) Date of Patent: Oct. 30, 2018

(54) POSITIONING APPARATUS (71) Applicant: DENSO CORPORATION, Kariya, Aichi-pref. (JP)

(72) Inventor: Toru Nagura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 284 days.

(21) Appl. No.: 14/935,144

(22) Filed: Nov. 6, 2015

(65) Prior Publication Data

US 2016/0131763 A1 May 12, 2016

(30) Foreign Application Priority Data

Nov. 6, 2014 (JP) ................................. 2014-225965

(51) Int. Cl.
*G01S 7/48* (2006.01)
*G01S 17/06* (2006.01)
*G01S 13/93* (2006.01)

(52) U.S. Cl.
CPC ............ *G01S 7/4808* (2013.01); *G01S 17/06* (2013.01); *G01S 13/93* (2013.01)

(58) Field of Classification Search
CPC ...... G01S 7/4808; G01S 17/06; G01S 13/931; G01S 13/9353; Y10S 707/919; Y10S 707/92

See application file for complete search history.

(56) References Cited

U.S. PATENT DOCUMENTS

| 6,438,491 B1* | 8/2002 | Farmer | B60W 30/16 340/435 |
| 2003/0218919 A1 | 11/2003 | Arita et al. | |
| 2008/0040029 A1* | 2/2008 | Breed | B60N 2/2863 701/514 |
| 2009/0228204 A1 | 9/2009 | Zavoli et al. | |
| 2014/0233010 A1* | 8/2014 | Baldwin | G01C 21/30 356/4.01 |
| 2015/0347840 A1* | 12/2015 | Iida | H04N 13/0203 382/103 |

FOREIGN PATENT DOCUMENTS

| JP | 2008-249639 A | 10/2008 |
| JP | 2014-160031 | 9/2014 |

* cited by examiner

*Primary Examiner* — Eric L Bolda
(74) *Attorney, Agent, or Firm* — Knobbe, Martens, Olson & Bear, LLP

(57) ABSTRACT

A positioning apparatus is mounted to an own vehicle, and performs positioning of the own vehicle. The positioning apparatus acquires a light reception pattern. The light reception pattern indicates a pattern of a change in strength of reflected light in relation to a position of the own vehicle. The reflected light is obtained using a light wave for measurement that has been transmitted from the own vehicle. The positioning apparatus estimates a position of the own vehicle by referencing a database in which a reference pattern is recorded in advance, and by comparing the light reception pattern and the reference pattern. The reference pattern indicates a pattern in which a strength of reflected light is associated with each position in which a vehicle travels.

12 Claims, 8 Drawing Sheets

- - - - REFERENCE TRAJECTORY f(s)
───── MEASURED TRAJECTORY g(s)

REFLECTION STRENGTH

DISTANCE

FIG.7

- - - - REFERENCE TRAJECTORY f1(s)
───── MEASURED TRAJECTORY g1(s)

RELATIVE DISTANCE

DISTANCE

POSITIONING APPARATUS

CROSS-REFERENCE TO RELATED APPLICATION

This application is based on and claims the benefit of priority from Japanese Patent Application No. 2014-225965, filed Nov. 6, 2014. The entire disclosure of the above application is incorporated herein by reference.

BACKGROUND

Technical Field

The present disclosure relates to a positioning apparatus that performs positioning of an own vehicle.

Related Art

As the above-described positioning apparatus, a positioning apparatus is known that estimates the position of the own vehicle by comparing a measurement value obtained by a sensor at that moment at a certain location and a measurement value in a database (refer to, for example, JP-A-2008-249639).

However, the above-described positioning apparatus uses the measurement value obtained by the sensor at that moment. Therefore, when numerous measurement values similar to the measurement value obtained by the sensor are present in the database, the positioning apparatus cannot select the correct measurement value. Therefore, a problem occurs in that the position of the own vehicle is erroneously recognized.

SUMMARY

It is thus desired to enable a positioning apparatus that performs positioning of an own vehicle to perform a more accurate positioning of the own vehicle.

An exemplary embodiment provides a positioning apparatus that is mounted to an own vehicle, and performs positioning of the own vehicle The positioning apparatus includes a light reception pattern acquisition unit and a first own vehicle position estimation unit. The light reception pattern acquisition unit acquires a light reception pattern that indicates a pattern of a change in strength of reflected light in relation to a position of the own vehicle. The reflected light is obtained using a light wave for measurement that has been transmitted from the own vehicle. The first own vehicle position estimation unit estimates a position of the own vehicle by referencing a database in which a reference pattern is recorded in advance, and by comparing the light reception pattern and the reference pattern. The reference pattern indicates a pattern in which a strength of the reflected light is associated with each position in which a vehicle travels.

In other words, in the positioning apparatus, the light reception pattern is obtained by the changes in the strength of reflected light, in relation to position, being monitored. The position of the own vehicle is then identified from the database based on the light reception pattern. In the positioning apparatus such as this, the position of the own vehicle is estimated using the light reception pattern, which tends to be unique. Therefore, positioning of the own vehicle can be more accurately performed.

The expression according to each claim may be arbitrarily combined if at all possible. In this case, some configurations may be omitted.

DESCRIPTION OF EMBODIMENTS

Embodiments of the present disclosure will hereinafter be described with reference to the drawings.

[First Embodiment]

[Configuration According to the Present Embodiment]

Figure 1:
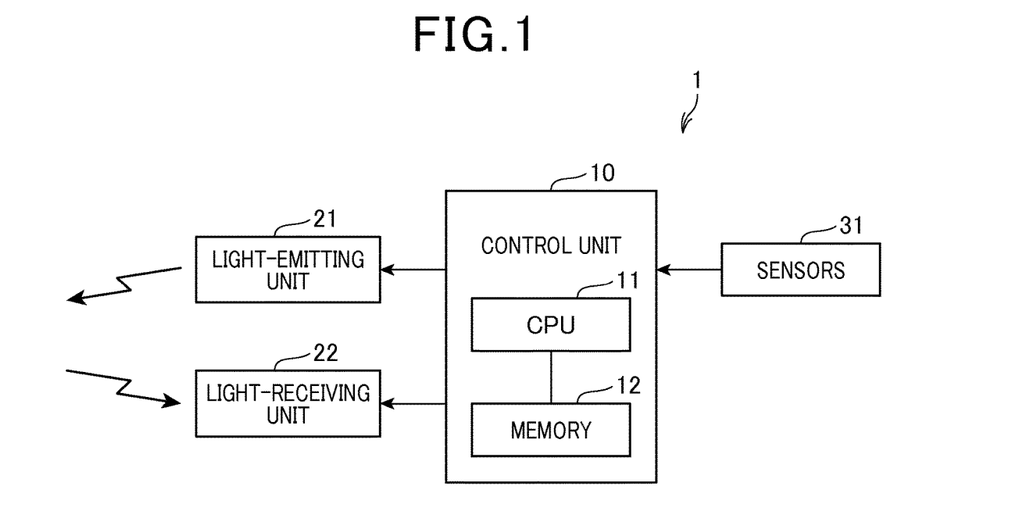
FIG. 1 is a block diagram of an overall configuration of a positioning apparatus to which an embodiment of the present disclosure is applied.

A positioning apparatus 1 to which a first embodiment is applied is, for example, mounted in a vehicle such as a passenger car (also referred to, hereafter, as an "own vehicle"). The positioning apparatus 1 provides a function for determining the position of the own vehicle. As shown in FIG. 1, the positioning apparatus 1 is configured to include a control unit 10, a light-emitting unit 21, a light-receiving unit 22, and sensors 31.

The light-emitting unit 21 scans laser light, for example, over a predetermined area in the advancing direction of the own vehicle. The light-receiving unit 22 receives reflected light when the laser light is irradiated on a target of some kind (such as a reflective object 200). Information on the reception strength of the reflected light is transmitted to the control unit 10.

The control unit 10 is configured as a computer that includes a central processing unit (CPU) 11 and a memory 12, such as a read-only memory (ROM) or a random access memory (RAM). The CPU 11 performs processes based on programs stored in the memory 12. The memory 12 also records therein a reference trajectory, described hereafter. In other words, the memory 12 also functions as a database for storing a reference trajectory.

The processes performed by the control unit 10 include, for example, a process for controlling the timing at which the laser light is emitted from the light-emitting unit 21, and a process for identifying the distance to and the orientation of a target based on the timing at which the reflected light is obtained. In other words, the control unit 10 identifies the position of the target from the distance to and the orientation of the target.

The control unit 10 also performs a positioning process for positioning the own vehicle using the position of the target. The positioning process will be described hereafter.

The sensors 31 include sensors used to position the own vehicle. For example, the sensors 31 include a vehicle speed sensor that detects the speed of the own vehicle, an acceleration sensor that detects the acceleration applied to the own vehicle, a yaw rate sensor that detects the angular velocity applied to the own vehicle, and a global positioning system (GPS) receiver that detects the position of the own vehicle.

Signals obtained by the sensors 31 are sent to the control unit 10.

[Overview of the Processes According to the Present Embodiment]

Figure 2:
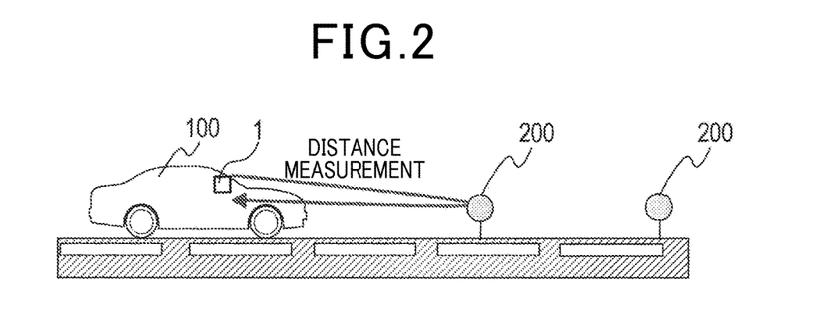
FIG. 2 is an explanatory diagram of an example of a scenario in which the positioning apparatus is used.

As shown in FIG. 2, the control unit 10 of the positioning apparatus 1 is used in a state in which the positioning apparatus 1 is mounted in an own vehicle 100. The control unit 10 repeatedly measures the distance to the reflective object 200, while moving with the movement of the own vehicle 100. In particular, according to the present embodiment, the control unit 10 mainly detects a retroreflective object, such as a reflector provided along the side of a road, as the reflective object 200.

Figure 3:
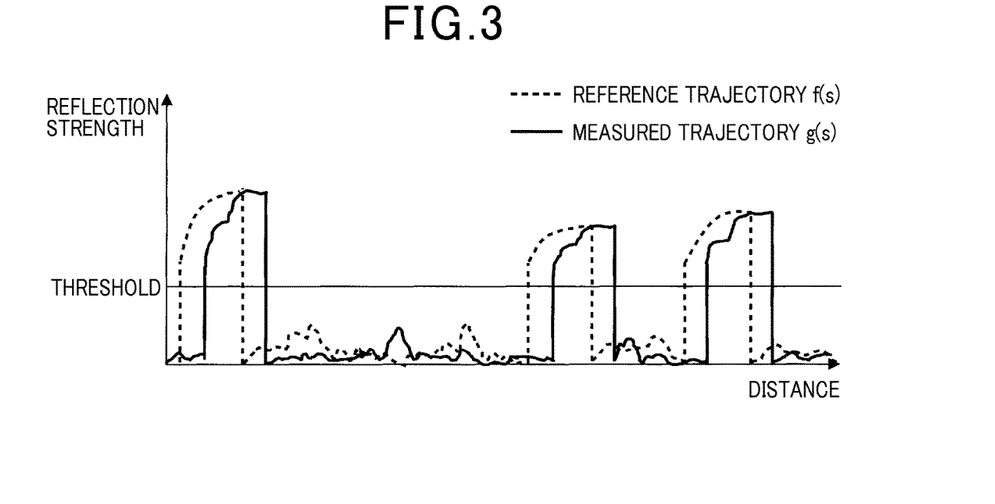
FIG. 3 is a graph indicating an example of a relationship between movement distance and reflection strength in which signals below a threshold are included.

When the control unit 10 detects the reflective object 200, for example, a graph of reflection strength values in relation to movement distance of the own vehicle 100, such as that shown in FIG. 3, is obtained. In the graph, a reference trajectory f(s) and a measured trajectory g(s) are indicated.

The reference trajectory is data indicating the relationship between the movement distance and the reflection strength value. The reference trajectory is prepared before measurement is performed. In the description hereafter, the reference trajectory may also indicate a relationship between the relative distance to a target or the relative orientation of the target, and the movement distance.

In addition, the measured trajectory is data indicating the relationship between the movement distance and the reflection strength value obtained when positioning is performed. In the description hereafter, like the reference trajectory, the measured trajectory may also indicate a relationship between the relative distance to a target or the relative orientation of the target, and the movement distance. That is, the reference trajectory and the measured trajectory are data indicating changes in the strength of the reflected light, the relative distance, or the relative orientation, in relation to position.

In addition, according to the present embodiment, the control unit 10 has a predetermined threshold, such as that shown in FIG. 3, to eliminate diffuse-reflective objects, which are common targets. As a result, the control unit 10 detects only retroreflective objects from which relatively high reflection strength can be obtained. The control unit 10 thereby eliminates signals below the threshold.

The control unit 10 estimates the position of the own vehicle using similarity that indicates the degree of similarity between the reference trajectory and the measured trajectory.

Figure 4:
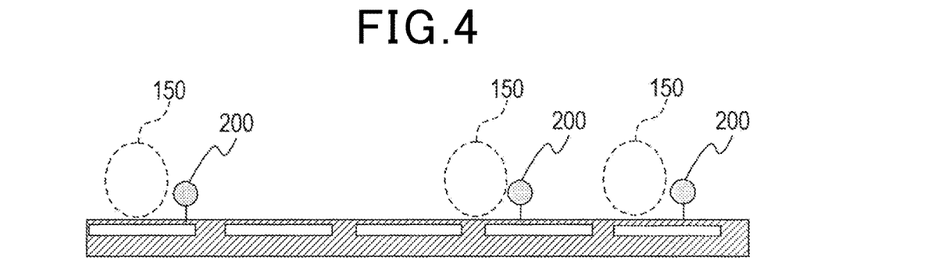
FIG. 4 is an explanatory diagram of an overview of a process for narrowing down the position of an own vehicle to an area just before a reflective object.

At a timing at which a reflection strength exceeding the threshold is obtained, as shown in FIG. 3, the positioning apparatus 1 can estimate that the own vehicle 100 is positioned in any of the areas 150 just before the reflective objects 200, as shown in FIG. 4. That is, the threshold is set such that the position of the own vehicle 100 can be easily narrowed down.

[Details of the Processes According to the Present Embodiment]

Figure 5:
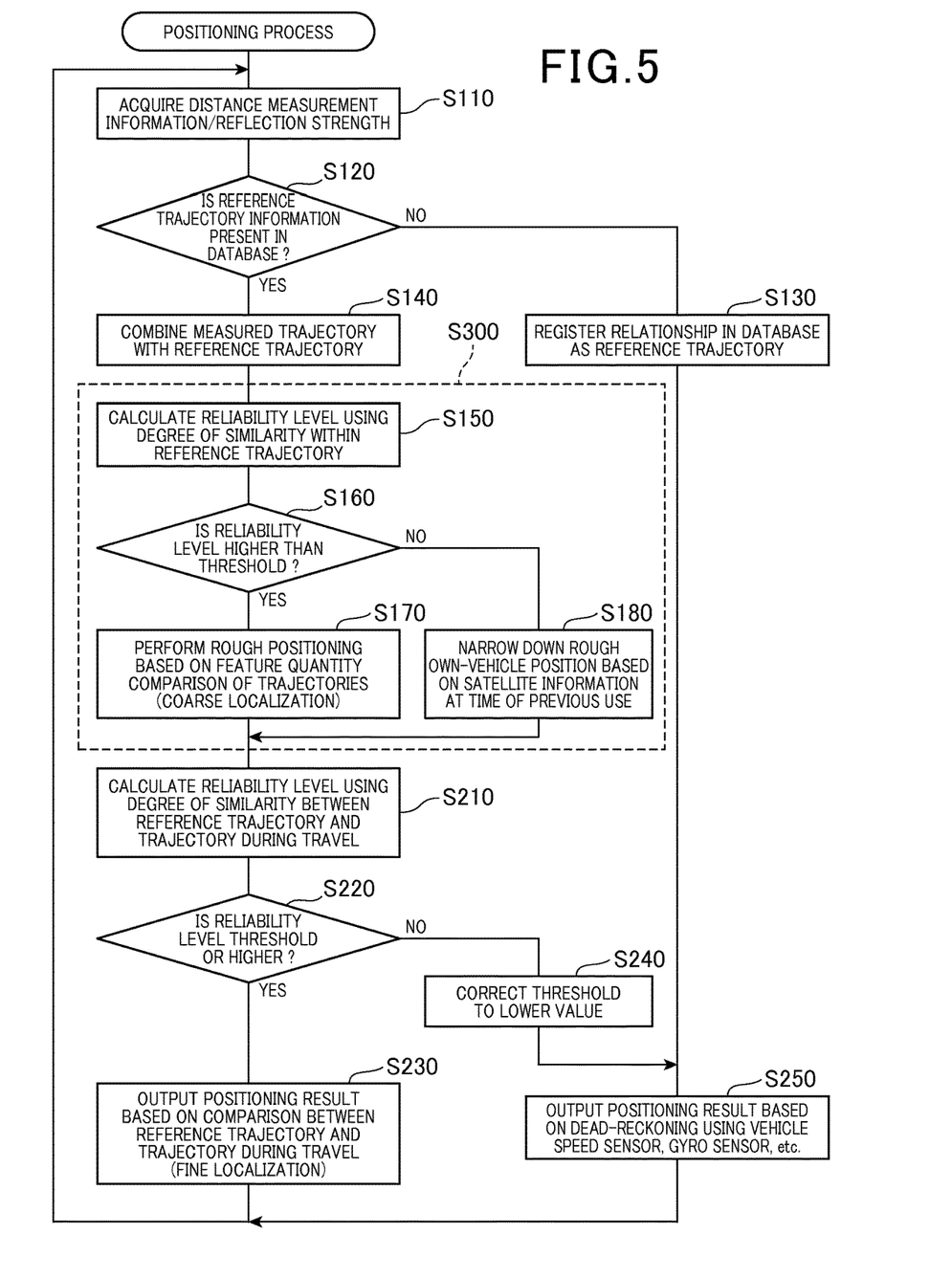
FIG. 5 is a flowchart of a positioning process performed by a control unit.

In the positioning apparatus 1, the control unit 10 performs a positioning process shown in FIG. 5. The positioning process is a process for performing positioning of the own vehicle. The positioning process is started when, for example, the power of the own vehicle is turned ON.

In the positioning process, first, as shown in FIG. 5, the control unit 10 acquires distance measurement information (step S110). That is, the control unit 10 acquires the reflection strength of the reflected waves of the laser light. At this time, the control unit 10 also acquires information on vehicle speed.

Next, the control unit 10 determines whether or not information on a reference trajectory corresponding to the approximate position of the own vehicle is present in the database (step S120). The approximate position of the own vehicle is determined using one or a plurality of detection results from the various sensors 31.

When determined that information on a reference trajectory is not present (NO at step S120), the control unit 10 registers the relationship between the position of the own vehicle and the reflection strength in the database as a reference trajectory (step S130). At the same time, the control unit 10 also registers the relationship between the position of the own vehicle and the position of the object (relative distance and orientation) in the database as a reference trajectory.

When the process at step S130 is performed only once, the reference trajectory is data indicating the relationship between the position of the own vehicle and the reflection strength over a very short distance. However, as a result of the process at step S130 being repeatedly performed, the reference trajectory becomes data indicating the relationship between the position of the own vehicle and the reflection strength over a relatively long distance. When the process is completed, the control unit 10 proceeds to the process at step S250, described hereafter.

Meanwhile, when determined that the information on the reference trajectory is present in the process at step S120 (YES at step S120), the control unit 10 calculates a reliability level using the degree of similarity between the reference trajectory and the trajectory during travel (the trajectory during travel is referred to as a "measured trajectory") (step S210). Here, the reliability level is defined, for example, based on a concept regarding the degree of similarity in the obtained reflection strength between the reference trajectory and the measured trajectory. For example, the reliability level is defined by the following formula 1.

[Formula 1]

$$R_{fg}(\tau)=\int_{-D_1}^{D_2}f(s)g(s-\tau)ds \quad [1]$$

In formula 1, above, $D_1$ indicates the starting point of the distance range over which the degree of similarity between the trajectories is calculated. $D_2$ indicates the end point of the distance range. In addition, s indicates the distance and $\tau$ indicates the amount of change in distance.

Figure 6:
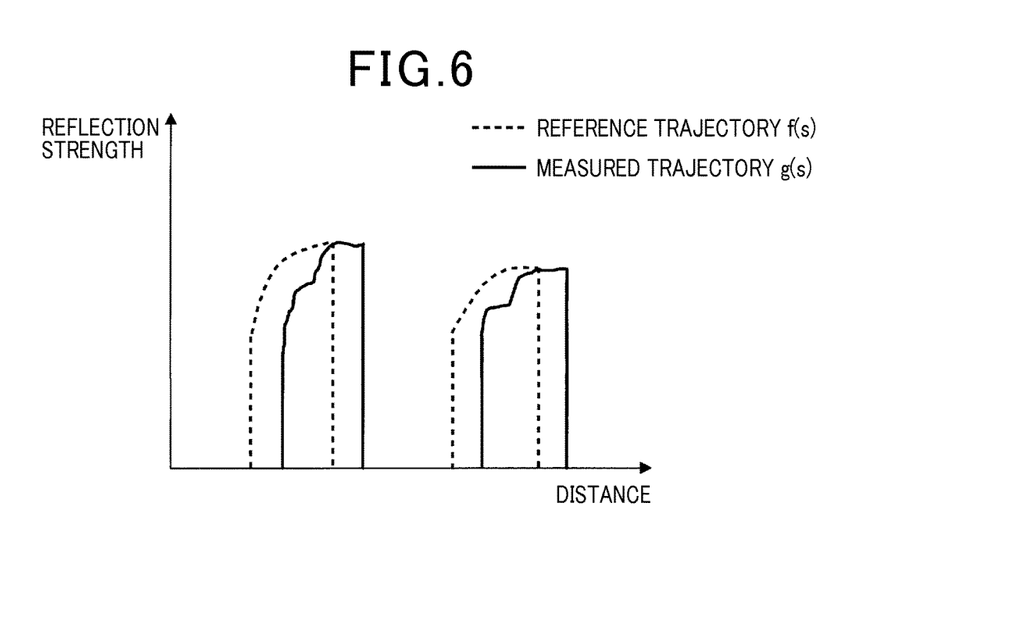
FIG. 6 is a graph indicating an example of the relationship between movement distance and reflection strength in an explanation regarding the determination of a reliability level for distance.

As shown in FIG. 6, when the measured trajectory g(s) is obtained relative to the reference trajectory f(s), the reliability level $R_{fg(\tau)}$ increases as the position of the rising point at which the reflection strength increases in the distance direction and the position of the falling point at which the reflection strength decreases become more similar between the reference trajectory f(s) and the measured trajectory g(s). Therefore, in formula 1, above, the value of $\tau$ at which the reliability level $R_{fg(\tau)}$ becomes the highest is found. The value of $\tau$ at this time is estimated as the position of the own vehicle corresponding to the reference trajectory.

In addition, for example, the reliability level can also be defined based on a concept regarding the degree of similarity in the relative distance or the relative orientation of the reflective object 200 in relation to the own vehicle, between the reference trajectory and the measured trajectory. When this definition is used, the reliability level based on this definition and the reliability level determined by formula 1, above, can be used in combination. The manner in which the reliability levels are combined, when a plurality of reliability levels are combined, is arbitrary. For example, a mean value, a weighted mean value, an additional value, or a weighted integration value can be used.

When the similarity in relative distance is used, for example, a reliability level $R_{f1g1}$ is defined by the following formula 2.

[Formula 2]

$$R_{f1g1} = \max_{\tau} \frac{\int_{-D_1}^{D_2} f1(s)g1(s-\tau)ds}{\sqrt{\int_{-D_1}^{D_2} f1^2(s)ds \times \int_{-D_1}^{D_2} g1^2(s-\tau)ds}} \quad [2]$$

In a manner similar to the foregoing, the value of $\tau$ at which the reliability level $R_{f1g1}$ is the highest is found.

Figure 7:
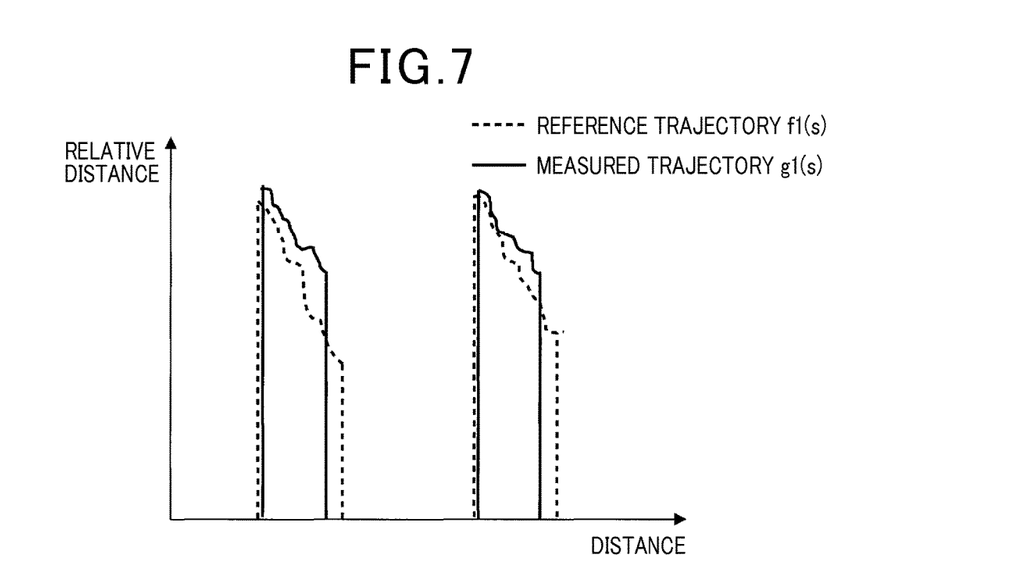
FIG. 7 is a graph indicating an example of a relationship between movement distance and relative distance in an explanation regarding the determination of a reliability level based on relative distance and relative orientation.

For example, in a relationship between a reference trajectory f1(s) and a measured trajectory g1(s) regarding relative distance, a relationship between the travel distance of the own vehicle and the relative distance to the reflective object 200, such as that shown in FIG. 7, is obtained. In this case, for example, a higher reliability level $R_{f1g1}$ is obtained as the value of the relative distance based on the reference trajectory f1(s) and the value of the relative distance based on the measured trajectory g1(s) become more similar at a position that serves as reference, such as the position of the rising point, the position of the falling point, or the center position between the rising point and the falling point.

In addition, when the similarity in relative orientation is used, for example, the reliability level $R_{f2g2}$ is defined by the following formula 3.

[Formula 3]

$$R_{f2g2} = \max_{\tau} \frac{\int_{-D_1}^{D_2} f2(s)g2(s-\tau)ds}{\sqrt{\int_{-D_1}^{D_2} f2^2(s)ds \times \int_{-D_1}^{D_2} g2^2(s-\tau)ds}} \quad [3]$$

In a manner similar to the foregoing, the value of $\tau$ at which the reliability level $R_{f2g2}$ is the highest is found.

Figure 8:
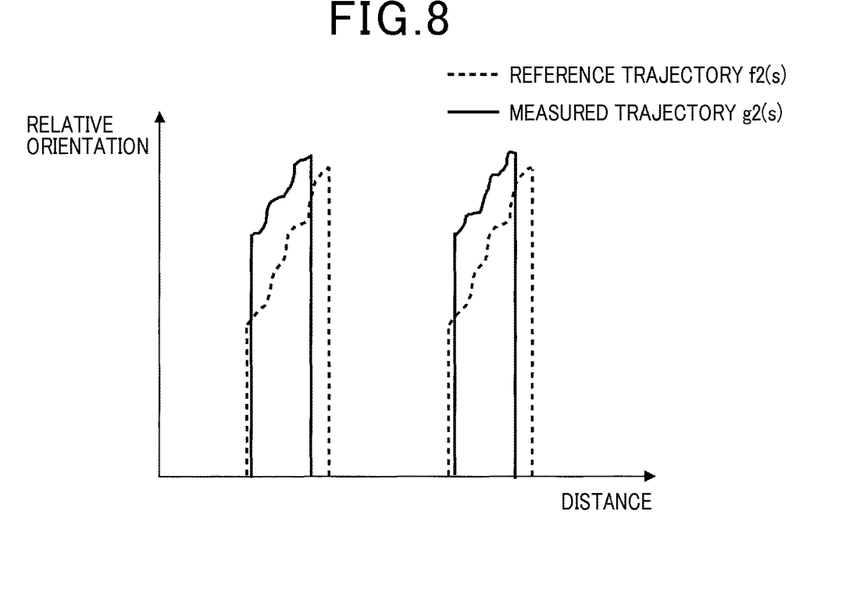
FIG. 8 is a graph indicating an example of a relationship between movement distance and relative orientation in an explanation regarding the determination of a reliability level based on relative distance and relative orientation.
Figure 9:
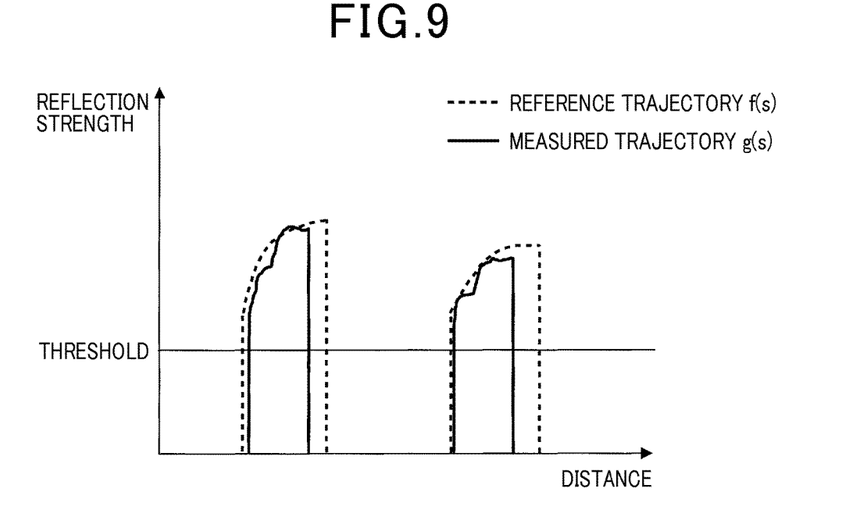
FIG. 9 is a graph indicating an example of a relationship between movement distance and reflection strength in an explanation regarding the determination of a reliability level based on relative distance and relative orientation.

For example, in a relationship between a reference trajectory f2(s) and a measured trajectory g2(s) regarding relative orientation, a relationship between the travel distance of the own vehicle and the relative orientation of the reflective object 200, such as that shown in FIG. 8, is obtained. In this case, for example, a higher reliability level $R_{f2g2}$ is obtained as the value of the relative orientation based on the reference trajectory f2(s) and the value of the relative orientation based on the measured trajectory g2(s) become more similar at a position that serves as reference, such as the position of the rising point, the position of the falling point, or the center position between the rising point and the falling point. When a reliability level using the relative distance or the relative orientation in this way is used, the reliability level can be favorably determined even when, for example, the measured trajectory is covered by the reference trajectory, and the displacement between the measured trajectory and the reference trajectory in the distance direction is unclear, as shown in FIG. 9.

Furthermore, the reliability level can be defined based on the degree of similarity in external environment.

Figure 10:
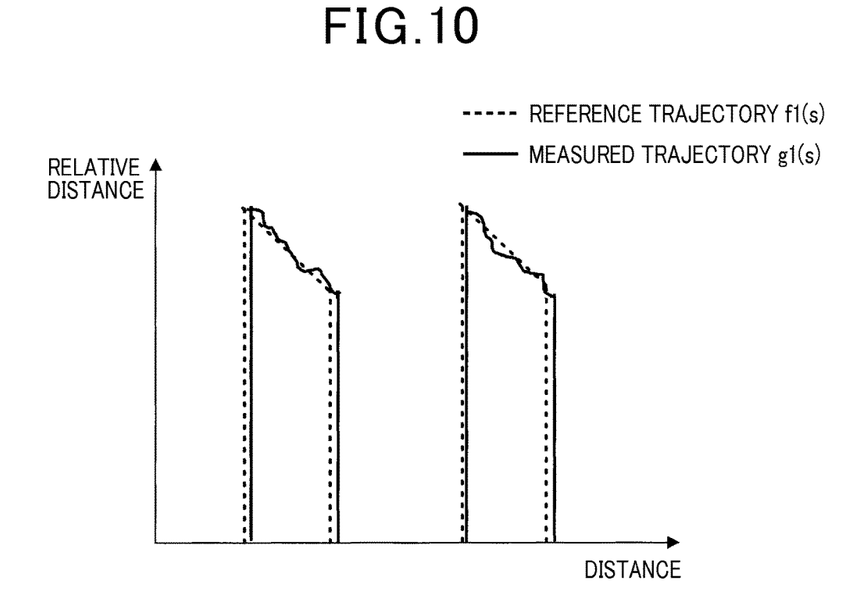
FIG. 10 is a graph indicating an example of a relationship between movement distance and relative distance in an explanation regarding the determination of a reliability level when the external environment changes.
Figure 11:
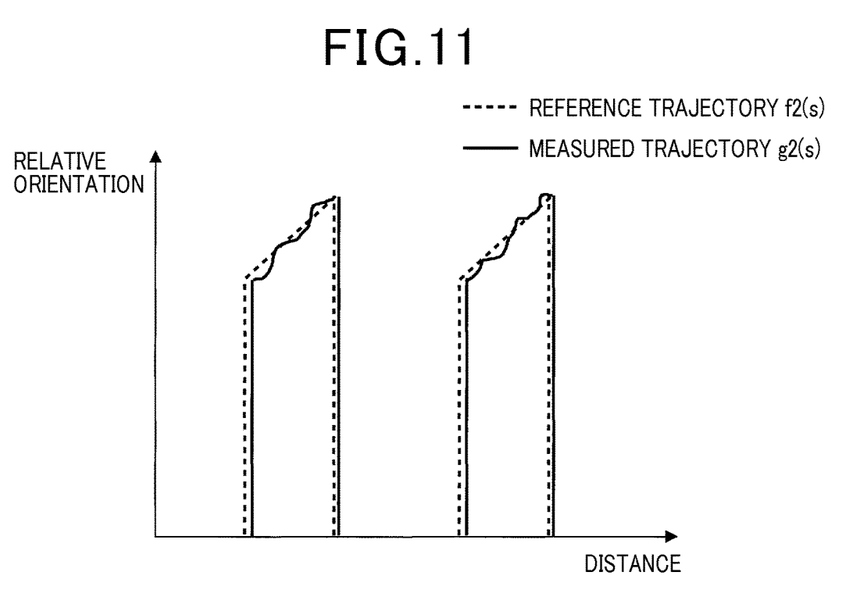
FIG. 11 is a graph indicating an example of a relationship between movement distance and relative orientation in an explanation regarding the determination of a reliability level when the external environment changes.
Figure 12:
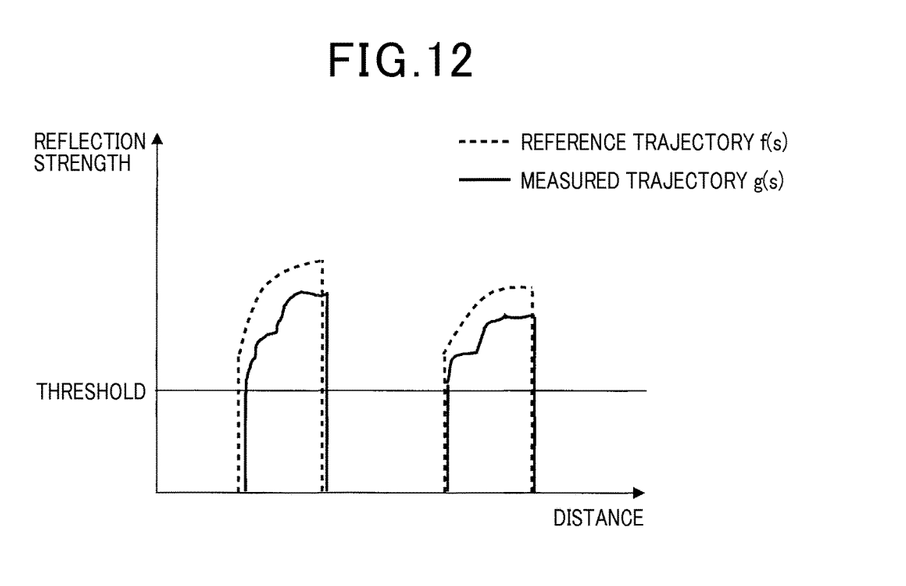
FIG. 12 is a graph indicating an example of a relationship between movement distance and reflection strength in an explanation regarding the determination of a reliability level when the external environment changes.

The reliability level being defined in this way is effective when, for example, in the relationship between the reference trajectory f1(s) and the measured trajectory g1(s) regarding the relative distance, a relationship between the travel distance of the own vehicle and the relative distance to the reflective object 200 such as that shown in FIG. 10 is obtained, and in the relationship between the reference trajectory f2(s) and the measured trajectory g2(s), a relationship between the travel distance of the own vehicle and the relative orientation of the reflective object 200 such as that shown in FIG. 11 is obtained. In other words, when there is very little difference in relative distance and relative orientation in the relationship between the reference trajectory and the measured trajectory g1, as shown in FIG. 10 and FIG. 11, but a difference in reflection strength is present as shown in FIG. 12, the reliability level can be defined using the difference in reflection strength as the degree of similarity in external environment.

For example, the reliability level can be defined by the following formula 4.

[Formula 4]

$$R_{fg} = \max_{\tau} \frac{\int_{-D_1}^{D_2} f(s)g(s-\tau)ds}{\sqrt{\int_{-D_1}^{D_2} f^2(s)ds \times \int_{-D_1}^{D_2} g^2(s-\tau)ds}} \quad [4]$$

In formula 4, above, $\tau=s1$ at which reliability level $R_{fg}$ becomes the highest is found.

Here, when the coefficient for correcting the effect of strength attenuation caused by the external environment is L, the changes in the external environment can be said to be steady changes when the value of L becomes greater than a certain threshold. Here, when g(s−τ) is substituted with L×g(s−τ), the reliability level can be improved by the following formula 5.

[Formula 5]

$$R_{fg}(L) = \frac{\int_{-D_1}^{D_2} L \times f(s) g(s-s1) \, ds}{\sqrt{\int_{-D_1}^{D_2} f^2(s) \, ds \times \int_{-D_1}^{D_2} L^2 \times g^2(s-s1) \, ds}} \quad [5]$$

Next, the control unit 10 compares the reliability level determined in the process at step S210 with a threshold that has been set in advance (step S220). When determined that the reliability level is the threshold or higher (YES at step S220), the control unit 10 outputs a positioning result based on the comparison between the reference trajectory and the measured trajectory (step S230). That is, the control unit 10 adds or subtracts the value of τ obtained in the process at step S210 to or from the distance obtained most recently by the own vehicle based on the vehicle speed sensor or the like. The control unit 10 thereby obtains the position of the own vehicle that is tied to the distance based on the reference trajectory. The control unit 10 sets this position as the positioning result. In this process, the control unit 10 estimates the position of the own vehicle by comparing the measured trajectory and the reference trajectory, and finding the section in which the trajectories match.

When a plurality of values of τ are determined in the process at step S210, any of the values of τ may be used. Alternatively, in a manner similar to the calculation in which the reliability levels are combined, a value of τ determined by combining the plurality of values of τ may be used. When the process at step S230 is completed, the control unit 10 returns to the process at step S110.

When determined that the reliability level is less than the threshold in the process at step S220 (NO at step S220), the control unit 10 corrects the threshold to a lower value (step S240). In this process, the control unit 10 reduces the threshold by a value or a ratio set in advance.

Next, the control unit 10 outputs the positioning result based on the various sensors 31, such as the vehicle speed sensor and a gyro sensor (step S250). In other words, when a reference trajectory is not present or when the reliability level is low even when a reference trajectory is present, the control unit 10 uses the position of the own vehicle obtained by other methods as the positioning result, rather than using the positioning result based on the comparison between the reference trajectory and the measured trajectory.

After completing a process such as this, the control unit 10 returns to the process at step S110.

[Effects According to the First Embodiment]

In the positioning apparatus 1, described in detail as above, the control unit 10 acquires a light reception pattern (measured trajectory) that indicates the changes in relation to position in the strength of reflected light obtained using a light wave for measurement being sent (step S110). Then, the control unit 10 references a database in which a reference pattern (reference trajectory) is recorded in advance. In the reference pattern, the strength of the reflected light is associated with each position in which the own vehicle travels. The control unit 10 compares the light reception pattern and the reference pattern, and estimates the own vehicle position by finding a section in which the patterns match (step S230).

In other words, the positioning apparatus 1 obtains the light reception pattern by monitoring the changes in the strength of reflected light, in relation to position. The position of the own vehicle is identified from the database based on the light reception pattern. In the positioning apparatus 1 such as this, the position of the own vehicle is estimated using the light reception pattern, which tends to be unique. Therefore, positioning of the own vehicle can be more accurately performed.

In addition, in the above-described positioning apparatus 1, the control unit 10 generates a reference pattern based on the acquired light reception pattern, and records the reference pattern in the database. In the positioning apparatus 1 such as this, the reference pattern can be prepared by the positioning apparatus 1 itself. For example, the reference pattern may only be generated in recording mode.

In addition, in the above-described positioning apparatus 1, the control unit 10 calculates the reliability level of when a first own vehicle position is estimated. The control unit 10 sets whether or not to use the first own vehicle position based on the reliability level.

In the positioning apparatus 1 such as this, whether or not to use the own vehicle position estimated by comparing the light reception pattern and the reference pattern as the position of the own vehicle is determined based on the reliability level of the own vehicle position. Therefore, erroneous detection of the position of the own vehicle can be suppressed.

When the reliability level is low, uniqueness is generated by the addition, to an infrastructure (roadside), of a reflective object that reflects the light wave for measurement.

In addition, in the above-described positioning apparatus 1, the control unit 10 estimates a second own vehicle position based on the sensors mounted in the own vehicle. When the value indicating the reliability level of the first own vehicle position is less than a threshold set in advance, the control unit 10 uses the second own vehicle position estimated based on the sensors as the position of the own vehicle.

In the positioning apparatus 1 such as this, when the reliability level of the first own vehicle position is low, the second own vehicle position based on the sensors mounted in the vehicle is used. Therefore, the estimation result of an own vehicle position estimated with relatively high accuracy can be used.

In addition, in the above-described positioning apparatus 1, the control unit 10 calculates the reliability level taking into consideration the degree of similarity in the environment in which the strength of the reflected wave is acquired, between the reference pattern and the light reception pattern.

In the positioning apparatus 1 such as this, the degree of similarity in environment is included in the reliability level. Therefore, the reliability level can be more accurately defined.

In addition, in the above-described positioning apparatus 1, the control unit 10 calculates the reliability level taking into consideration the degrees of similarity in the relative distance and the relative orientation of the reflective object that reflects the light wave for measurement, between the reference pattern and the light reception pattern.

In the positioning apparatus 1 such as this, the changes in the traveling environment are included in the reliability level. Therefore, the reliability level can be more accurately defined.

In addition, in the above-described positioning apparatus 1, the control unit 10 calculates the reliability level taking into consideration the degree of similarity in the external environment (for example, the weather, such as rain or fog, or soiling of a camera) between the reference pattern and the light reception pattern.

In the positioning apparatus 1 such as this, the reliability level can be more accurately defined as a result of the changes in the traveling environment being included in the reliability level.

In addition, in the above-described positioning apparatus 1, strength of the reflected light that is equal to or lower than a threshold set in advance is eliminated from the light reception pattern and the reference pattern.

In the positioning apparatus 1 such as this, the effects of noise can be reduced.

In addition, in the above-described positioning apparatus 1, the threshold is set based on the reflection strength from a retroreflective object.

In the positioning apparatus 1 such as this, the effects of diffuse-reflective objects can be eliminated, and positioning can be performed taking into consideration only the position of a retroreflective object.

[Second Embodiment]

Next, a positioning apparatus 1 according to another embodiment will be described. According to the present embodiment (second embodiment), only sections differing from those of the positioning apparatus 1 according to the first embodiment will be described in detail. Sections that are similar to those of the positioning apparatus 1 according to the first embodiment are given the same reference numbers. Descriptions thereof are omitted.

In the positioning apparatus 1 according to the present embodiment, a process at step S140 and a position narrowing-down process (step S300) are performed between the process at step S120 and the process at step S210 in the positioning process shown in FIG. 5. The process at step S140 and the position narrowing-down process are started when the control unit 10 determines YES in the process at step S120.

In the process at step S140, as shown in FIG. 5, the control unit 10 adds the obtained measured trajectory to the database and combines the measured trajectory with the reference trajectory that has already been recorded (step S140). Then, in the position narrowing-down process, first, the control unit 10 calculates the reliability level using the degree of similarity within the reference trajectory (step S150).

In this process, the control unit 10 calculates the reliability level based on the degree of uniqueness in the changes in the strength of the reflected light in the reference trajectory. For example, the control unit 10 calculates the reliability level based on the degree of uniqueness in the spatial interval between reflective objects 200 that reflect the light wave for measurement, using only the reference trajectory.

Specifically, in the reference trajectory f1(s) regarding the relative distance, the spatial interval between the reflective objects 200, that is, the distance between the reflective objects 200 is defined by the following formula 6, with the travel distance corresponding to a certain reference value (see FIG. 13) that is set regarding the relative distance as d(n).

[Formula 6]

$$d(n)=d2-d1, d3-d2, d4-d3, \quad [6]$$

Then, the reliability level using the spatial interval between the reflective objects 200 can be defined by the following formula 7.

[Formula 7]

$$R_d = \frac{\sum_{N_1}^{N_2} d^2(n)}{\max_{\delta \neq 0} \sum_{N_1}^{N_2} d(n)d(n+\delta)} \quad [7]$$

In formula 7, above, N1 indicates the starting point of a search range, among the elements of the spatial interval between the reflective objects 200, and N2 indicates the end point of the search range. δ at which the reliability level is the lowest is found.

Figure 13:
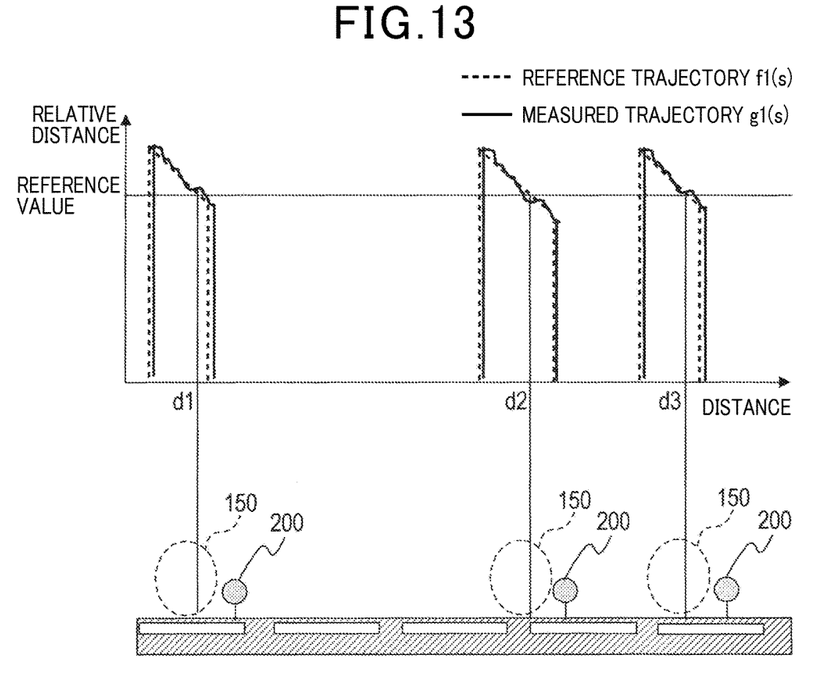
FIG. 13 is a graph indicating an example of a relationship between movement distance and relative distance in an explanation regarding the determination of a reliability level for distance to a reflective object.

When the reliability level is high, as shown in FIG. 13, the area 150, among the plurality of areas 150 immediately before the reflective objects 200, in which the own vehicle is positioned, can be easily estimated.

In addition, the reliability level herein can also be defined by the following formula 8, based on an autocorrelation value of the reference trajectory that has shifted in the distance direction by an amount equal to or greater than a reflection strength acquisition period (distance) of the reflective objects 200 (such as the interval between reflective objects).

[Formula 8]

$$R_{ff} = D(\tau) \frac{\int_{D_3}^{D_4} f^2(s)\,ds}{\max_{\tau \geq \varepsilon} \int_{D_3}^{D_4} f(s)f(s+\tau)\,ds} \quad [8]$$

In formula 8, above, $D_3$ indicates the starting point of a distance range over which the degree of similarity within the trajectory is calculated, and $D_4$ indicates the end point of the distance range.

Figure 14:
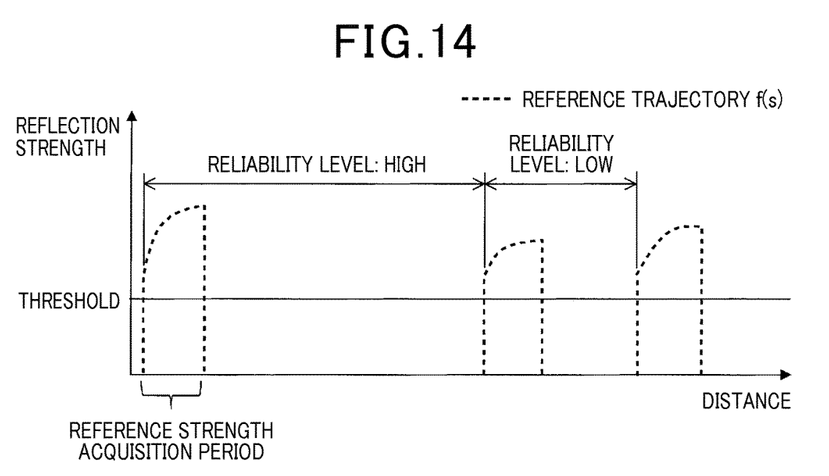
FIG. 14 is a graph indicating an example of a relationship between movement distance and reflection strength in an explanation regarding the determination of a reliability level for distance to a reflective object.

The reliability level decreases as the shapes of the trajectory during the reflection strength acquisition period become more similar. The reliability level increases as the shapes of the trajectory become more different. In addition, as shown in FIG. 14, the reliability level tends to become a lower value in an area in which the interval between the reflective objects 200 is short, and a higher value in an area in which the interval between the reflective objects 200 is wide.

Next, the control unit 10 compares the reliability level obtained in the process at step S160 and a threshold set in advance for this reliability level (step S160). When determined that the reliability level is the threshold or higher (YES at step S160), the control unit 10 performs a rough positioning based on feature quantity comparison of the trajectories.

In other words, as shown in FIG. 3, when the reflective object 200 is detected, it is recognized that the own vehicle is present in any of the plurality of areas 150 just before the reflective objects 200. When the reflective object 200 is not detected, it is recognized that the own vehicle is present in any area that is not any of the plurality of areas 150 just before the reflective objects 200.

The control unit 10 identifies the area, among the plurality of areas 150 and the areas between the plurality of areas 150, in which the own vehicle is positioned by comparing the overall shapes of the reflection strength trajectories and using feature quantities such as the spatial interval between the reflective objects 200, in the reference trajectory and the measured trajectory. When a process such as this is completed, the control unit 10 proceeds to step S210.

In addition, when determined that the reliability level is lower than the threshold in the process at step S160 (YES at step S160), the control unit 10 narrows down the approximate position of the own vehicle based on, for example, the travel distance since obtaining a previous positioning result using the GPS or the like (step S180). When a process such as this is completed, the control unit 10 proceeds to the process at step S210.

[Effects According to the Second Embodiment]

In addition, in the above-described positioning apparatus 1, the control unit 10 calculates the reliability level based on the degree of uniqueness in the strength of reflected light changes in the reference pattern.

In the positioning apparatus 1 such as this, the reliability level can be determined from only the reference pattern.

In addition, in the positioning apparatus 1, the control unit 10 calculates the reliability level based on the degree of uniqueness in the spatial interval between reflective objects that reflect the light wave for measurement in the reference pattern.

In the positioning apparatus 1 such as this, the reliability level can be guaranteed based on the degree of uniqueness of each interval between the reflective objects. The positioning accuracy can be improved when a degree of uniqueness is present in each interval between the reflective objects.

In addition, in the above-described positioning apparatus 1, the control unit 10 calculates the reliability level based on the autocorrelation value of the reference pattern that has been spatially shifted by an amount corresponding to the interval between the reflective objects.

In the positioning apparatus 1 such as this, the reliability level is calculated based on the autocorrelation value of the reference pattern. Therefore, the positioning accuracy can be improved when a degree of uniqueness is present in each interval between the reflective objects.

[Other Embodiments]

The interpretation of the present disclosure is not limited in any way by the above-described embodiments. In addition, the reference numbers used in the descriptions of the above-described embodiments are also used as appropriate in the claims. However, the reference numbers are used for the purpose of facilitating understanding of the disclosure according to each claim and are not intended to limit the technical scope of the disclosure according to each claim. A function provided by a single constituent element according to the above-described embodiments may be dispersed as a plurality of constituent elements, or functions provided by a plurality of constituent elements may be integrated into a single constituent element. Furthermore, at least a part of the configuration according to the above-described embodiments may be replaced with a publically known configuration having similar functions. Moreover, at least a part of the configuration according to the above-described embodiments may be added to or replace a configuration according to another of the above-described embodiments. Any embodiment included in the technical concept specified only by the wordings of the scope of claims is an embodiment of the present disclosure.

The present disclosure can also be actualized by various modes in addition to the above-described positioning apparatus 1, such as a system of which a constituent element is the positioning apparatus 1, a program enabling a computer to function as the positioning apparatus 1, a recording medium on which the program is recorded, and a positioning method.

For example, according to the above-described embodiments, the processes at steps S150 to S240 are described as being performed at all times. However, these processes may only be performed when the current location cannot be acquired by the GPS receiver.

[Correspondence Between the Configuration According to the Embodiments and the Means of the Present Disclosure]

The measured trajectory according to the above-described embodiments corresponds to a light reception pattern of the present disclosure. The reference trajectory according to the above-described embodiments corresponds to a reference pattern of the present disclosure. The process at step S110, among the processes performed by the control unit 10 according to the above-described embodiments, corresponds to a light reception pattern acquisition unit of the present disclosure. The process at step S130 according to the above-described embodiments corresponds to a reference pattern generator of the present disclosure.

Furthermore, the processes at steps S150 and S210 according to the above-described embodiments corresponds to a reliability level calculator of the present disclosure. The processes at steps S160 and S220 according to the above-described embodiments corresponds to an adoption determination (or setting) unit of the present disclosure. In addition, the processes at steps S180 and S250 according to the above-described embodiments corresponds to a second own vehicle position estimation unit of the present disclosure. The process at step S230 according to the above-described embodiments corresponds to a first own vehicle position estimation unit of the present disclosure.

What is claimed is:

1. A positioning apparatus that is mounted to an own vehicle, and performs positioning of the own vehicle, the positioning apparatus comprising:
a light reception pattern acquisition unit that acquires a light reception pattern, the light reception pattern indicating a pattern of a change in strength of reflected light in relation to a position of the own vehicle, the reflected light being obtained using a light wave for measurement that has been transmitted from the own vehicle;
a first own vehicle position estimation unit that estimates a position of the own vehicle by referencing a database in which a reference pattern is recorded in advance, and by comparing the light reception pattern and the reference pattern, the reference pattern indicating a pattern in which a strength of reflected light is associated with each position in which a vehicle travels;
a reliability level calculator that calculates a reliability level of the position of the own vehicle estimated by the first own vehicle position estimation unit; and
an adoption determination unit that determines whether or not the estimated position of the own vehicle is adopted as a position of the own vehicle by comparing the light reception pattern and the reference pattern based on the reliability level, wherein
the reliability level calculator calculates the reliability level taking into consideration a degree of similarity in an environment in which a strength of reflected light is acquired, between the reference pattern and the light reception pattern.

2. The positioning apparatus according to claim 1, further comprising:
a reference pattern generator that generates the reference pattern based on the obtained reflected light, and records the generated reference pattern in the database.

3. The positioning apparatus according to claim 1, further comprising:
a second own vehicle position estimation unit that estimates a position of the own vehicle using a sensor that is mounted to the own vehicle,
wherein the adoption determination unit adopts, as the position of the own vehicle, the estimated position of the own vehicle estimated using the sensor, when a value of the reliability level is lower than a predetermined threshold.

4. The positioning apparatus according to claim 1, wherein:
the reliability level calculator calculates the reliability level taking into consideration a degree of similarity in a relative distance of a reflective object that reflects the light wave for measurement or a degree of similarity in a relative orientation of the reflective object, between the reference pattern and the light reception pattern.

5. The positioning apparatus according to claim 1, wherein:
the reliability level calculator calculates the reliability level taking into consideration a degree of similarity in an external environment between the reference pattern and the light reception pattern.

6. The positioning apparatus according to claim 1, wherein:
the reliability level calculator calculates the reliability level based on a distinctiveness in which a strength of reflected light changes in the reference pattern.

7. The positioning apparatus according to claim 1, wherein:
the reliability level calculator calculates the reliability level based on a distinctiveness in a spatial interval between reflective objects that reflect the light wave for measurement in the reference pattern.

8. The positioning apparatus according to claim 6, wherein:
the reliability level calculator calculates the reliability level based on an autocorrelation value of the reference pattern that has been spatially shifted by an amount corresponding to a spatial interval between reflective objects that reflect the light wave for measurement.

9. A positioning apparatus that is mounted to an own vehicle, and performs positioning of the own vehicle, the positioning apparatus comprising:
a light reception pattern acquisition unit that acquires a light reception pattern, the light reception pattern indicating a pattern of a change in strength of reflected light in relation to a position of the own vehicle, the reflected light being obtained using a light wave for measurement that has been transmitted from the own vehicle; and
a first own vehicle position estimation unit that estimates a position of the own vehicle by referencing a database in which a reference pattern is recorded in advance, and by comparing the light reception pattern and the reference pattern, the reference pattern indicating a pattern in which a strength of reflected light is associated with each position in which a vehicle travels, wherein
the reference pattern and the light reception pattern are configured such that a strength of reflected light equal to or lower than a predetermined threshold is eliminated from the reference pattern and the light reception pattern.

10. The positioning apparatus according to claim 9, wherein:
the predetermined threshold is set based on a reflection strength from a retroreflective object.

11. A method for performing positioning of an own vehicle by a positioning apparatus that is mounted to the own vehicle, the method comprising:
acquiring, by the positioning apparatus, a light reception pattern, the light reception pattern indicating a pattern of a change in strength of reflected light in relation to a position of the own vehicle, the reflected light being obtained using a light wave for measurement that has been transmitted from the own vehicle;
estimating, by the positioning apparatus, a position of the own vehicle by referencing a database in which a reference pattern is recorded in advance and by comparing the light reception pattern and the reference pattern, the reference pattern indicating a pattern in which a strength of reflected light is associated with each position in which a vehicle travels;
calculating, by a reliability level calculator, a reliability level of the position of the own vehicle estimated by the first own vehicle position estimation unit; and
determining, by an adoption determination unit, whether or not the estimated position of the own vehicle is adopted as a position of the own vehicle by comparing the light reception pattern and the reference pattern based on the reliability level, wherein
the reliability level calculator calculates the reliability level taking into consideration a degree of similarity in an environment in which a strength of reflected light is acquired, between the reference pattern and the light reception pattern.

12. A method for performing positioning of an own vehicle by a positioning apparatus that is mounted to the own vehicle, the method comprising:
acquiring, by the positioning apparatus, a light reception pattern, the light reception pattern indicating a pattern of a change in strength of reflected light in relation to a position of the own vehicle, the reflected light being obtained using a light wave for measurement that has been transmitted from the own vehicle; and
estimating, by the positioning apparatus, a position of the own vehicle by referencing a database in which a reference pattern is recorded in advance and by comparing the light reception pattern and the reference pattern, the reference pattern indicating a pattern in which a strength of reflected light is associated with each position in which a vehicle travels, wherein
the reference pattern and the light reception pattern are configured such that a strength of reflected light equal to or lower than a predetermined threshold is eliminated from the reference pattern and the light reception pattern.

* * * * *